Patented Apr. 10, 1951

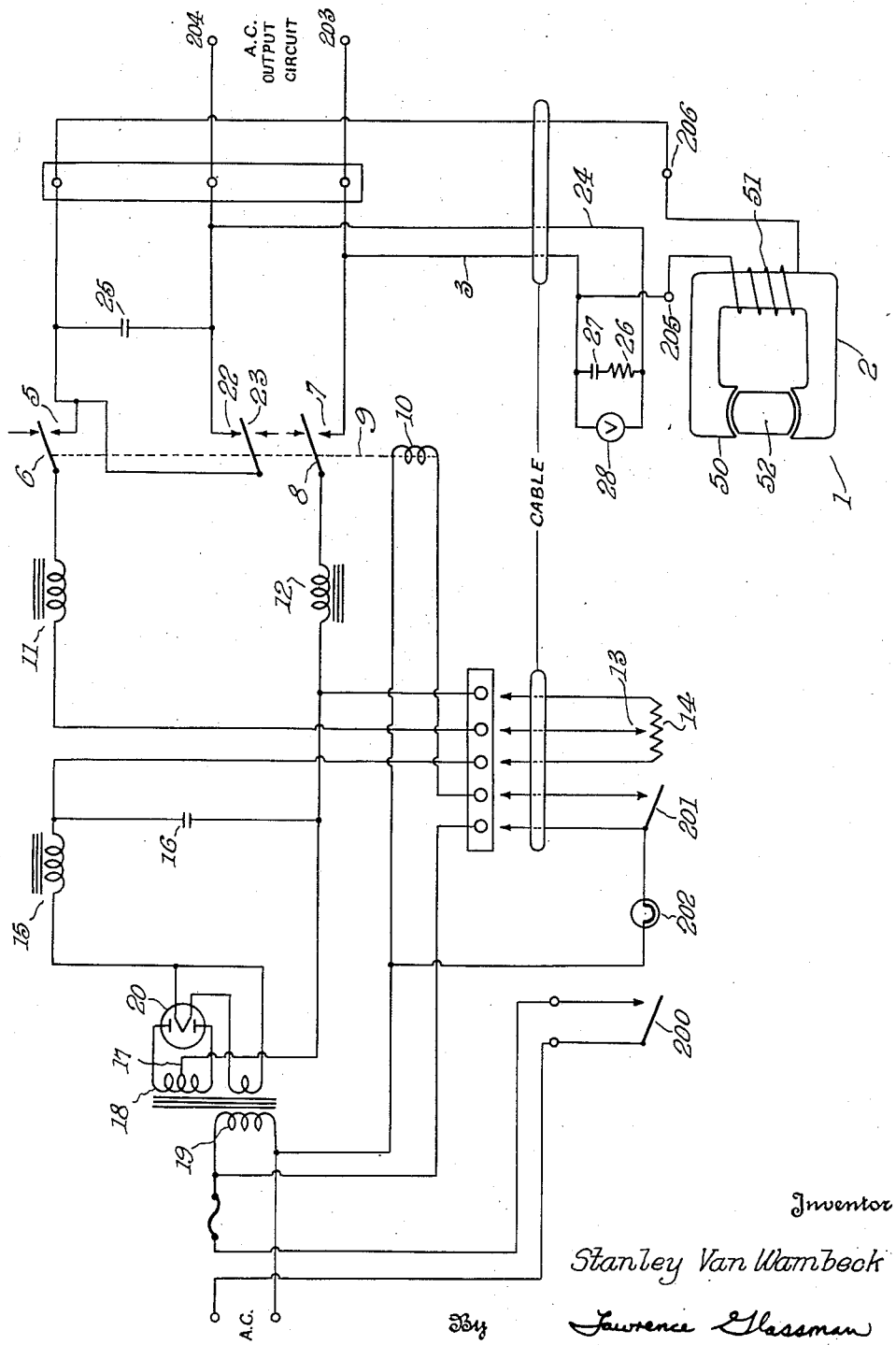

2,548,833

UNITED STATES PATENT OFFICE 2,548,833

GENERATOR TESTING DEVICE

Stanley H. Van Wambeck, Richmond Heights, Mo., assignor to the United States of America as represented by the Secretary of War Application June 7, 1945, Serial No. 598,170

8 Claims. (Cl. 322—95)

The invention described herein may be manufactured and used by or for the Government for governmental purposes, without the payment of any royalty thereon.

This invention relates to means for calibrating alternating current, permanent magnet generators.

It is an object of this invention to provide means for use as a test device in which the magnetization of the permanent magnet of a high frequency alternator can be manually adjusted so that the generator produces a proper voltage for the speed at which it is operating. Through such test, the output voltage of the generator at each of several adjustments of the degree of magnetization of the generator may be determined. The adjusting means may then be calibrated so that in the future, the setting of the adjusting means required to produce a desired output voltage will be known.

More specifically this invention utilizes a high frequency alternating current generator having permanent magnets forming a part thereof, a rectifying circuit forming a supply of direct current, a potentiometer connected to said supply and to said generator so the manual adjustment of said potentiometer varies the magnetization of said generator and consequently varies its output voltage, an output circuit connected across the terminals of said generator and containing a blocking condenser so that the direct current is kept out of said output circuit, and a voltmeter or other measuring device connected in said output circuit.

Other objects of this invention will be apparent or will be made clear as the description of this invention in the specification proceeds, together with the illustration of it in the accompanying drawings. At the end of this specification those novel features I desire to hold by Letters Patent will be pointed out and claimed.

The single figure of the drawings is a schematic electric circuit diagram.

This invention may obviously take many forms, of which I have chosen one to be the preferred embodiment.

This embodiment comprises a high frequency alternating current generator 1 having as parts thereof permanent magnets 2, soft iron pole pieces 50, winding 51, soft iron rotor 52, and generator terminals 205 and 206. Alternator 1 is connected to leads 3 and 4 and conveniently operated at 1,000 cycles per second. Connected to lead 4 is a stationary relay contact 5 cooperating with a movable relay contact 6 while connected to lead 3 is a stationary relay contact 7 cooperating with movable relay contact 8. Movable relay contacts 6 and 8 are arranged to be operated by an armature 9 and a coil 10 controlling this armature. Connected to movable relay contacts 6 and 8 through a pair of choke or filter coils 11 and 12 are respectively a slider 13 and one end of a potentiometer resistor 14. Resistor 14 conveniently has a value of 5,000 ohms. The opposite end of resistor 14 is connected to a choke or filter coil 15 and a filter condenser 16. Condenser 16 is connected to the mid-tap 17 of the secondary 18 of a transformer. Coil 15 is connected to the cathode of a rectifying tube 20 whose anodes are connected to the ends of coil 18. The primary 19 of the transformer is connected to a source of alternating current across which relay coil 10 is also connected through switch 200. Pilot lamp 202 is in parallel with primary 19 and, in its illuminated condition, indicates that main switch 200 is closed so that primary 19 is energized.

Lead 4 and stationary relay contact 5 have a short-circuit 21 connected thereto in which is mounted a switch comprising stationary relay contact 22 and movable relay contact 23. Stationary contact 22 is connected to lead 24. A blocking condenser 25, conveniently of two microfarads capacity, is connected in parallel to short-circuit 21 between leads 4 and 24. Also connected between leads 3 and 24 is a resistor 26 and a capacitor 27 and a voltmeter 28 in parallel with said resistor and capacitor. Leads 3 and 24 pass through alternating current output terminals 203 and 204, respectively. To terminals 203 and 204 is connected an alternating current output circuit.

With the relay contacts in the position shown on the drawing, contact 23 engages contact 22, while contact 6 is out of engagement with contact 5, and contact 8 is out of engagement with contact 7. Generator winding 51 is thus disconnected from the direct current voltage supply. In this position of the relay, condenser 25 is shorted out, since the circuit through short-circuit 21 is closed by engagement of contacts 22 and 23. Alternating current from the generator passes through lead 4, short-circuit 21, contacts 23 and 22, lead 24, resistor 26 and condenser 27 to lead 3 and then back to the generator.

To feed direct current to generator winding 51, switch 200 is first closed, thus energizing tube 20 to provide a direct current power supply. Switch 201 is then closed, energizing relay coil 10 and causing armature 9 to move relay contact 23 away from relay contact 22, while moving relay contact 6 into engagement with relay contact 5, and relay contact 8 into engagement with relay contact 7.

Direct current is now fed from tube 20, through resistor 14, slider 13, choke coil 11, contacts 6 and 5, lead 4, generator winding 51, lead 3, contacts 7 and 8, and choke coil 12, back to tube 20. Condenser 25, of course, blocks direct current from passing from lead 3 back to lead 4 by way of resistor 26, condenser 27 and lead 24. The alternating-current output of the generator will, however, pass through this latter circuit, while being prevented from passing to the tube 20, by choke coils 11 and 12.

Through adjusting the position of the slider 13 with respect to the resistor 14, the direct current voltage which is impressed on the generator may be varied. This variation of voltage serves to vary the magnetization of permanent magnets 2, and to adjust the magnetization of those permanent magnets so that the output voltage of alternator 1 is that which is desired for the speed at which it is operating. At the normal operating frequency of 1,000 cycles per second, the chokes 11 and 12 have a total reactance of approximately 0.2 megohm. This impedance, bridged across the terminals of generator 1, composes no appreciable A. C. load and lowers the output voltage very little. This means that the observed voltages from the generator are not materially altered as the device operates.

I claim:

1. An alternating current power supply having an adjustable output voltage, and comprising: an alternating current generator which includes generator terminals, permanent magnet means for producing a magnetic field in the generator, and a winding connected to the generator terminals and so located as to influence the strength of the magnetic field; an alternating current output circuit; a source of direct current; and circuit means connecting the source and the alternating current output circuit with the generator terminals, thus modifying the magnetic field and as a result the alternating current output voltage of the generator, such circuit means including means for blocking direct current from the alternating current output circuit and means for blocking alternating current from the source of direct current.

2. An alternating current power supply, as described in claim 1, in which the circuit means include also means for modifying the potential of the direct current supplied by the source.

3. An alternating current power supply having an adjustable output voltage, and comprising: an alternating current generator which includes generator terminals, permanent magnet means for producing a magnetic field in the generator, and a winding connected to the generator terminals and so located as to influence the strength of the magnetic field; an alternating current output circuit; a source of direct current; and circuit means connecting the source and the alternating current output circuit with the generator terminals, thus modifying the magnetic field and as a result the alternating current output voltage of the generator, such circuit means including first blocking means for blocking direct current from the alternating current output circuit, second blocking means for blocking alternating current from the source of direct current, switch means which in a first position disconnect such source from and in a second position connect such source with the generator terminals, and a short-circuit path around the first blocking means, such path passing through the switch means and being closed only in the first position of such switch means.

4. An alternating current power supply, as described in claim 3, in which the circuit means include also means for modifying the potential of the direct current supplied by the source.

5. Apparatus for adjusting the voltage supplied to an output circuit by an alternating current generator which includes generator terminals, permanent magnet means for producing a magnetic field in the generator, and a winding connected to the generator terminals and so located as to influence the strength of the magnetic field, such apparatus comprising: a source of direct current; and circuit means connecting the source and the output circuit with the generator terminals, thus modifying the magnetic field and as a result the output voltage of the generator, such circuit means including means for blocking direct current from the output circuit and means for blocking alternating current from the source of direct current.

6. Apparatus, as described in claim 5, in which the circuit means include also means for modifying the potential of the direct current supplied by the source.

7. An alternating current power supply, as described in claim 3, in which the circuit means include also a variable resistance for modifying the potential of the direct current supplied by the source, this resistance being calibrated so that each of several values of the resistance corresponds to a respective output voltage of the generator.

8. Apparatus, as described in claim 5, in which the circuit means include also a variable resistance for modifying the potential of the direct current supplied by the source, this resistance being calibrated so that each of several values of the resistance corresponds to a respective output voltage of the generator.

STANLEY H. VAN WAMBECK.

REFERENCES CITED

The following references are of record in the file of this patent:

UNITED STATES PATENTS

| Number | Name | Date |
|---|---|---|
| 2,118,313 | Kongsted | May 24, 1938 |

FOREIGN PATENTS

| Number | Country | Date |
|---|---|---|
| 554,832 | Great Britain | Apr. 29, 1942 |